Feb. 9, 1932.  M. ARMENTROUT  1,844,236
PISTON
Filed Feb. 18, 1930
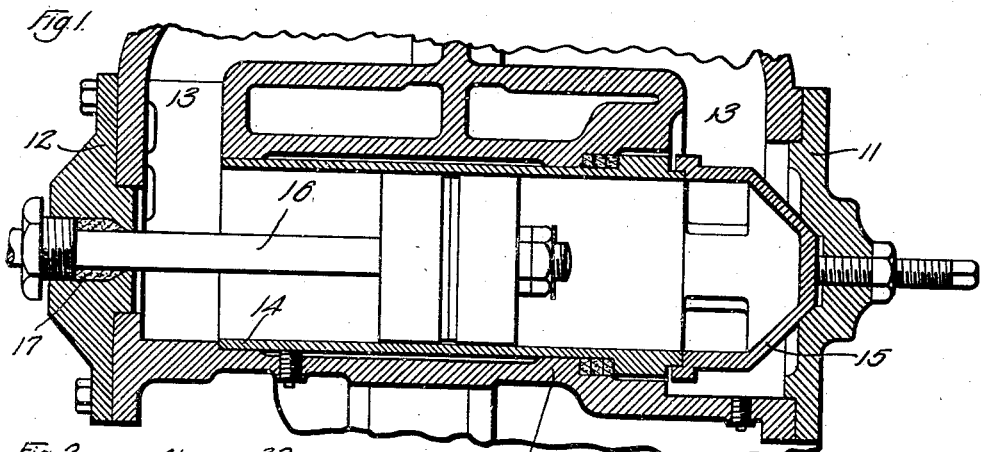
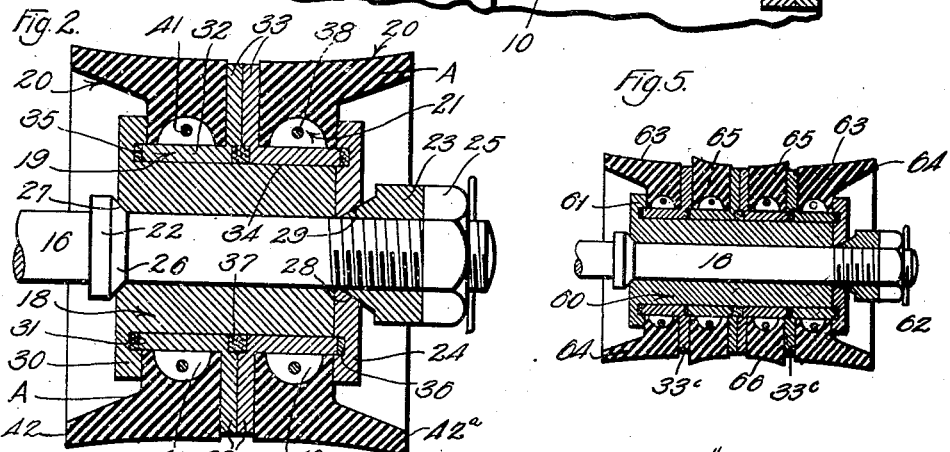
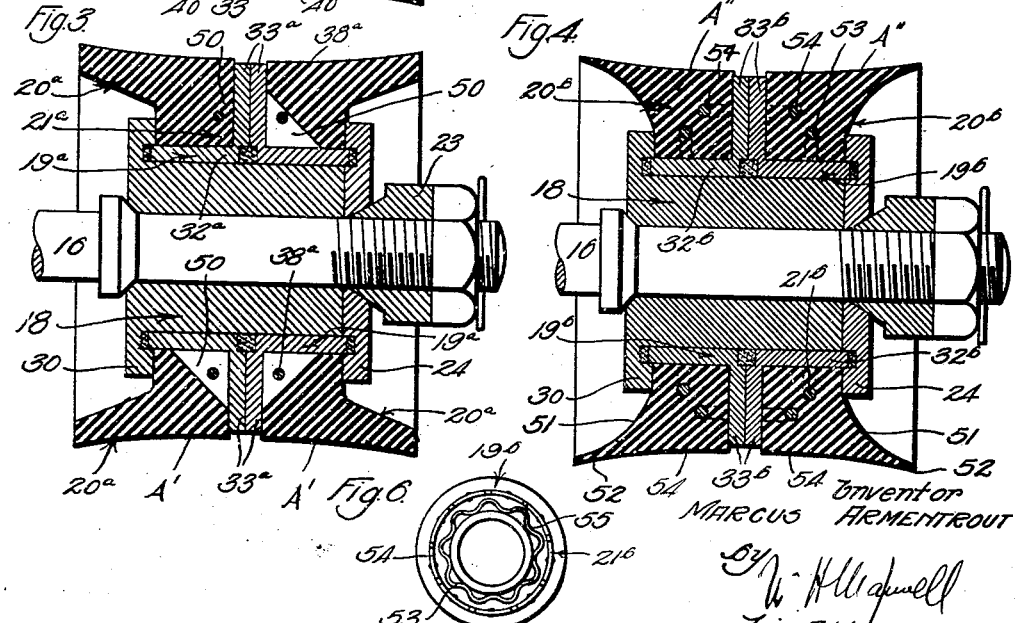
Inventor
MARCUS ARMENTROUT
His Attorney Patented Feb. 9, 1932

1,844,236

UNITED STATES PATENT OFFICE

MARCUS ARMENTROUT, OF LONG BEACH, CALIFORNIA

PISTON

Application filed February 18, 1930. Serial No. 429,371.

This invention relates to a piston and relates more particularly to a piston suitable for use in a pump, or the like.

The pistons of certain types of pumps and of pumps for handling fluid containing abrasives and solid matter wear very quickly and require adjustment or replacement after short periods of use. I will refer particularly to pistons of slush pumps for handling rotary mud used in well drilling. The rotary mud commonly used in well drilling operations usually contains a substantial proportion of solid matter which acts to abrade or cut out the pistons of the slush pumps so that they soon require replacement. Slush pumps usually handle rotary mud at high pressures and it is necessary to provide the pump pistons with packing which seals tightly and effectively with the cylinder walls of the pump. It is common practice to provide slush pump pistons with yielding or resilient packing formed of rubber or rubber compositions. This yielding packing is usually molded, vulcanized, or directly fixed on the piston bodies in other manners and, when the packing becomes worn and ineffective through the action of the solid matter in the rotary mud, it becomes necessary to replace the pistons. As the packing is usually secured directly to the bodies or cores of the pistons, it is necessary to replace the entire pistons when the packing becomes worn and ineffective.

It is a general object of the present invention to provide a piston suited for use in a slush pump, or the like, in which the packing may be replaced when necessary without replacing the entire piston.

Another object of the invention is to provide a piston for a pump, or the like, in which the packing may be easily and quickly removed when worn or ineffective and new packing mounted on the piston without removing the piston from the piston rod.

Another object of the invention is to provide replaceable packing units for a pump piston that are particularly inexpensive of manufacture and are of extremely simple construction.

Another object of the invention is to provide replaceable packing units for a pump piston, or the like, that embody substantially rigid frames or bodies for mounting resilient packing on the core of the piston and having improved means for securing or bonding the packing to the bodies so that the packing is free to flex and effectively seal with the walls of the cylinder in which the piston is operating. The resilient packing may be vulcanized directly on the bodies of the units and is molded on or encases flexible securing or bonding parts on the bodies which effectively secure the packing to the bodies and permit the packing to be compressed by the pressures developed in the pump cylinder so that it is forced or expanded into pressure sealing engagement with the cylinder walls without becoming displaced or loosened from the bodies of the units.

A further object of the invention is to provide replaceable packing units of the character mentioned that may be arranged on the piston of a single acting pump or that may be arranged at opposite ends of the piston of a double acting pump, or that may be arranged in a plurality of oppositely disposed pairs on a piston.

Other objects and features of the invention will be best and more fully understood from the following detailed description of typical preferred forms and applications of the invention, throughout which description reference will be had to the accompanying drawings, in which:

Fig. 1 is a longitudinal detailed sectional view of a portion of a typical slush pump illustrating a piston provided by the present invention in operative position in the cylinder. Fig. 2 is an enlarged transverse detailed sectional view of a form of the invention. Fig. 3 is a detailed transverse sectional view of another form of the invention. Fig. 4 is a detailed transverse sectional view of another embodiment of the invention. Fig. 5 is a reduced transverse sectional view illustrating a typical manner of arranging a plurality of the packing units provided by this invention on the core of a piston, and Fig. 6 is a reduced end view of the body of a packing unit provided in the form of the invention shown in Fig. 4, showing it apart from the packing.

The piston provided by the present invention is adapted for use in various forms of pumps, machines, etc. For example, the piston construction of the present invention may be embodied in the pistons of single-acting pumps or double-acting pumps for handling various fluids of various characters. Throughout the following detailed description I will describe in detail several forms or embodiments of the invention particularly suited for use in a slush pump for handling fluid containing solid matter at high pressures. It is to be understood, however, that the invention is not to be construed as limited to the particular embodiments about to be described nor to the particular application of these embodiments, but is to be taken as including any features or modifications that may fall within the scope of the claims.

In Fig. 1 of the drawings I have illustrated a typical form of slush pump for handling rotary mud, or the like, in which the forms of the invention about to be described are adapted for use. The pump illustrated in the drawings includes, generally, a cylinder 10 closed at its opposite ends by heads 11 and 12 and having ports 13 at its opposite ends, a liner 14 arranged in the cylinder 10, a clamp or spider 15 for securing the liner 14 in the cylinder, a piston rod 16 extending through the head 12 and projecting into the cylinder 10, a packing gland 17 in the head 12 to seal around the rod 16, and various other parts common to pumps of this class.

The embodiment or form of the invention shown in Fig. 2 of the drawings includes, generally, a core 18 to be mounted on the piston rod 16 and one or more replaceable packing units A removably secured to the core 18; each unit A including a body 19, resilient packing 20 molded or vulcanized on the body 19 and adapted to slidably engage the walls of a cylinder, and flexible bonding or securing means 21 for reinforcing the packing 20 and for effectively securing the packing to the body 19.

The core 18 is an elongated cylindrical member arranged axially or longitudinally on the piston rod 16. The core 18 may be mounted directly on the rod 16 and may be secured to the piston rod in any suitable manner. In the particular case illustrated the piston rod 16 is provided with an annular enlargement or projection 22 adapted to receive or form an abutment for the outer end of the core 18. The core 18 may be clamped or held against the enlargement 22 by a nut 23 screw threaded on the inner end of the piston rod 16 and acting or clamping against the inner end of the core 18 through a follower or end plate 24. The end plate 24 is arranged on the piston rod 16 at the inner end of the core 18 and acts to removably retain the packing units A on the core 18 as will be hereinafter described. A lock nut 25 may be threaded on the inner end of the piston rod 16 to set or lock the nut 23 in position. In the particular form of construction illustrated the inner side 26 of the enlargement or projection 22 is tapered or beveled and seats in a beveled seat 27 in the outer end of the core 18. The nut 23 may be provided with a tapered end 28 to extend into a correspondingly shaped seat 29 in the inner side of the end plate 24.

The core 18 is preferably of round cross sectional configuration and may be of uniform diameter throughout its length. An integral end plate or flange 30 is provided at the outer end of the core 18. The flange 30 is preferably of considerably less diameter than the cylinder in which the piston is to operate so that there is a substantial space between the periphery of the flange 30 and the walls of the cylinder. An annular recess 31 is provided in the inner side of the flange 30.

The units A are detachably mounted on the core 18 and are held between the flange 30 and the end plate 24. There may be any desired number of units mounted on the core 18. For example, in a piston of a single-acting pump a single unit A may be mounted on the active end of the piston or core. In Fig. 2 of the drawings I have illustrated an arrangement suitable for use in a double-acting pump wherein there are two oppositely disposed units carried by the core 18. The units A may be alike in construction.

The body 19 of each unit A is preferably a substantially rigid part and is provided to support or mount the packing 20 on the core 18. Each body 19 may be an integral part of simple formation. Each body 19 consists of a tubular part 32 surrounding or arranged on the core 18, and an outwardly projecting flange 33 at one end of the tubular portion 32. The tubular portions 32 of the bodies 19 may be of round cross sectional configuration and are provided with central openings 34 to slidably receive or pass the core 18. In accordance with the arrangement illustrated in Fig. 2, the bodies 19 of the two units A are disposed on the core 18 so that the outer sides of their respective flanges 33 abut at a point approximately midway between the opposite ends of the core 18. The flanges 33 of the bodies 19 may be of slightly less diameter than the cylinder in which the piston is to operate. The flanges 33 may extend or project outwardly from the tubular portions 32 at angles of substantially 90°.

The outer or plain end of the body 19 of the unit A carried on the outer end of the core 18 extends into the recess 31 in the flange 30. Suitable packing 35 may be arranged in the recess 31. The outer or plain end of the tubular portion 32 of the unit A mounted on the inner end of the core 18 may extend into an annular recess 36 in the side of the end plate 24. Suitable packing may be provided in the recess 36. The bodies 19 of the two units A are clamped together in position between the flange 30 and the end plate 24 by the nut 23 clamped against the inner side of the end plate 24. Packing 37 may be arranged in registering recesses in the abutting sides of the flanges 33. The bodies 19 of the units A, constructed in the manner just described, may be of comparatively light construction and are simple of manufacture.

The bodies 19, or the rigid elements of the replaceable packing units provided by the invention, may be formed or manufactured of any suitable material. It is preferred, however, to form the bodies 19 of pressed or stamped metal; for example, pressed or stamped steel. The bodies being of substantially L shaped cross section are firm and rigid when formed of comparatively light material.

The packing 20 is preferably molded or vulcanized directly on the exteriors of the bodies 19 of the units A and the bonding means 21 is provided to permanently secure the packing 20 to the bodies 19 and to reinforce the packing 20. In accordance with the preferred form of the invention the bonding means 21 permits free radial expansion or flexing of the packing 20. The means 21 includes one or more flexible members 38 attached or secured to each of the bodies 19 and embedded in the packing 20. In the embodiment of the invention shown in Fig. 2 I have illustrated a single flexible bonding member 38 on each body 19. The bonding members 38 are flexible or yielding and may be formed of wire, or the like. The members 38 may be annular or in the form of rings and are of greater diameter than the tubular portions 32 of the bodies 19. The members 38 surround the tubular portions 32 and are preferably arranged concentric to the portions 32.

Means is provided for securing the members 38 to the bodies 19 of the units A. In the particular embodiment of the invention illustrated in Fig. 2, a plurality of circumferentially spaced radially projecting lugs 40 are provided on the tubular portions 32 of the bodies 19. The lugs 40 may extend longitudinally or axially of the portions 32. The lugs 40 are provided with transverse openings 41 passing or carrying the members 38. The outer sides of the lugs 40 may be curved as illustrated in Fig. 2. The members 38 insure the permanent bonding of the packing 20 to the bodies 19 of the unit A, and being flexible, permit the packing 20 to be flexed and compressed without becoming loosened or displaced from the bodies 19. The lugs 40 aid in preventing axial and circumferential displacement of the packing 20 from the bodies 19.

The packing 20 is preferably formed of rubber or a rubber composition and is preferably vulcanized directly on the exteriors of the tubular portions 32 and the lateral sides of the flanges 33 of the bodies 19. The packing 20 is shaped and mounted to effectively seal with the walls of the cylinder or with the cylinder liner 14. The bodies of packing 20 completely encase the members 38 and the lugs 40. The packing 20 is preferably formed in a single solid body on each of the bodies 19. The packing 20, on the unit A disposed on the outer portion of the core 18, extends between the flange 33 of the unit body 19 and the flange 30 of the core 18. The packing 20, of the unit A on the inner portion of the core 18, extends between the lateral side of the flange 33 and the end plate 24. The packing 20 may be initially formed so that it will be compressed somewhat when the units A are mounted on the core 18 between the end plates 24 and the flange 30.

The packing 20 of the unit A on the outer end of the core 18 has an axially or outwardly projecting portion 42 overhanging or projecting beyond the flange 30. The packing 20 of the other unit A has a similar portion $42^a$ projecting over or beyond the end plate 24. The active or outer ends of the packing 20 of the units A may be recessed or made concave and may taper axially and radially outward from points adjacent the ends plates toward the outer ends of the projecting portions 42 and $42^a$. In accordance with the preferred form of the invention, the packing is normally of greater diameter than the cylinder or liner in which it is to operate when unconfined in the cylinder, so that when the piston is confined or operating in the cylinder its exterior or periphery is in pressure engagement with the walls of the cylinder. The packing 20 may project a short distance outwardly from the peripheries of the flanges 33. The peripheries of the bodies of packing 20 may be tapered or curved outwardly from the flanges 33 to the extremities of the projecting portions 42 and $42^a$. By forming the peripheries of the packing in this manner, the assembly of the two units A on the core 18, provides a substantially concave periphery or exterior on the piston. The projecting portions 42 and $42^a$ are of greater diameter than the other parts of the packing so that the leading or advancing parts of the packing are always in tight pressure engagement with the walls of the cylinder to prevent solid matter and abrasives from becoming lodged on the exterior or periphery of the piston.

The bodies of packing 20 normally being of greater diameter than the cylinder or liner 14, the peripheries of the packing parts of the piston are in pressure engagement with the liner 14 or cylinder walls throughout their lengths as illustrated in Fig. 1 of the drawings. The flanges 33 act to support the packing 20 against axial displacement and form abutments against which the packing 20 is compressed when pressure is developed in the pump cylinder. Upon pressure being developed in the cylinder, the packing 20 on the advancing end of the piston is axially compressed and radially expanded so that its periphery is brought into effective sealing engagement with the cylinder walls.

In the form of the invention illustrated in Fig. 3 of the drawings there are two like replaceable packing units A′ oppositely arranged on the core 18. The units A′ include bodies 19$^a$ similar to the bodies 19 of the form of the invention described above, packing 20$^a$, and means 21$^a$ for flexibly bonding the packing to the bodies 19$^a$. The bodies 19$^a$ may be removably secured on the core 18 in the same manner that the bodies 19 of the units A are secured on the core 18, that is, they may be clamped together between a flange 30 on the core 18 and the end plate 24 on the piston rod 16, by means of a nut 23. The bodies 19$^a$ may be similar, generally, to the bodies 19 above described, having tubular portions 32$^a$ on the core 18 and radial flanges 33$^a$ at the abutting ends of the portions 32$^a$.

The packing 20$^a$ may be the same as the packing 20 and may be molded or vulcanized directly on the bodies 19$^a$.

The bonding means 21$^a$ includes flexible members 38$^a$ which may be formed of wire, or the like and which are carried by the bodies 19$^a$. The members 38$^a$ surround the tubular portions 32$^a$ of the bodies 19$^a$ and may be secured to the bodies by being arranged through transverse openings in circumferentially spaced ribs 50 on the bodies 19$^a$. The ribs 50 carry the members 38$^a$ so that they are spaced from the tubular portions 32$^a$ and the flanges 33$^a$. The ribs 50 project radially outward from the tubular portions 32$^a$ and axially from the outer sides of the flanges 33$^a$, being arranged in the corners formed by the portions 32$^a$ and the flanges 33$^a$. The upper or outer edges of the ribs 50 may extend diagonally between the exteriors of the tubular portions 32$^a$ and the lateral faces of the flanges 33$^a$. In this embodiment of the invention the flexible bonding members 38$^a$ operate to securely bind or attach the packing 20$^a$ to the bodies of the units so that it is free to flex or expand. The ribs 50 of this form of the invention aid in preventing circumferential displacement or loosening of the packing 20$^a$.

In Figs. 4 and 6 of the drawings I have illustrated a form of the invention in which two like replaceable packing units A″ are arranged on the core 18. The bodies 19$^b$ of the units A″ may be similar to the bodies 19 of the units A described above and the units may be removably clamped on the core 18 in the same manner as the units A. The bodies 19$^b$, like the bodies 19, consist of tubular portions 32$^b$ surrounding the core 18 and radial flanges 33$^b$. Packing 20$^b$ is supported on the bodies 19$^b$. The packing 20$^b$ may be molded or vulcanized directly on the bodies of the units and may be similar, generally, to the packing 20. In this particular embodiment of the invention the active ends 51 of the packing 20$^b$ are made concave and are curved outwardly from the flange 30 and end plate 24. Each of the bodies of packing 20$^b$ has an axial projecting portion 52 at its outer or active end extending over or overhanging an end of the core 18. The peripheries of the bodies of the packing 20$^b$ may be curved or made concave as illustrated in Fig. 4 of the drawings. The ends 51 of the packing parts 20$^b$ may join the peripheries of the packing at the outer ends of the overhanging portions 52. The packing 20$^b$ is made of larger diameter than the cylinder in which the piston is to operate so that the peripheries of the packing will at all times be in pressure engagement with the walls of the cylinder. Pressure developed in the cylinder during operation of the piston will act on the concave ends 51 of the packing to compress the packing into tight, effective sealing engagement with the walls of the cylinder.

The bonding means 21$^b$ for reinforcing the packing 20$^b$ and securely bonding the packing to the bodies 19$^b$ includes one or more flexible members 53 embedded in the packing 20$^b$ of each unit A″ and attached to the tubular portion 32$^b$ of each body 19$^b$ at spaced points, and one or more flexible bonding members 54 embedded in each body of packing 20$^b$ and secured to the flange 33$^b$ of each unit A″ at spaced points. The members 53 and 54 may be formed of wire, bands of metal, or the like, and in accordance with the invention are flexible to permit expansion and compression of the packing 20$^b$. There may be any desired number of members 53 and 54 provided on each body 19$^b$. In the particular case illustrated in Figs. 4 and 6 of the drawings I have shown a single member 53 and a single member 54 on each body 19$^b$. The members 53 are annular in their general configuration being of larger diameter than the tubular portions 32$^b$. The members 53 are circumferentially crimped or made serpentine to have alternate depressions and waves. The members 53 may be secured or attached to the bodies 19$^b$ in any suitable manner. For example, the spaced or alternate inwardly curved parts 55 of the members 53 may be welded to the exteriors of the portions 32$^b$. The general configuration of the members 53 will be apparent from an inspection of Fig. 6 of the drawings.

The members 54 may be of the same general construction as the members 53, being annular parts or rings. The members 53 are likewise crimped to have alternate depressions and projecting portions. The members 54 may be attached to the flanges 33$^b$ in the same manner as the members 53 are attached to the bodies; that is the spaced curved or projecting parts may be welded to the flanges. The members 53 and 54 are preferably completely embedded or encased in the packing 20ᵇ and may be spaced apart in the manner illustrated in Fig. 4 of the drawings. It is to be noted that this form of the invention provides a construction which is extremely simple and in which the packing is effectively secured to the bodies 19ᵇ in a manner which permits its being freely flexed and compressed. The members 53 and 54 being flexible parts, allow the packing 20ᵇ to operate effectively and act to reinforce the packing and to dependably secure it to the bodies of the units A″.

In Fig. 5 of the drawings I have illustrated an assembly or arrangement in which a plurality of replaceable packing units are mounted upon a core 60. In this construction the core 60 may be similar, generally, to the core 18 described above and may be comparatively long. The core 60 may have a flange 61 at its outer end and an end plate 62 may be mounted on the piston rod 16 at the inner end of the core 60. I have illustrated two like packing units 63 on the core 60, one unit 63 being mounted at each end of the core 60. The units 63 may be similar or identical with the units A of the form of the invention described above and may be arranged on the core 60 so that the axially projecting portions 64 of the packing units project outwardly or axially from the opposite ends of the core 60. The units 63 are arranged on the core 60 so that the radial flanges 33ᶜ of the bodies of the units are oppositely disposed and are spaced apart.

I have shown two like oppositely disposed packing units 65 arranged or clamped between the flanges 33ᶜ of the unit 63. The replaceable packing units 65 may be similar to the units 63 and are clamped between the units 64 so that their packing 66 is compressed so that it projects radially outward from the piston. If desirable or necessary, the packing 66 of the units 65 may be made somewhat smaller than the packing of the units 63 so that the units 65 may be readily arranged between the flanges 33ᶜ. The replaceable packing units provided by this invention may be arranged or mounted on the core of a piston in various manners and may be modified in construction somewhat to be adapted to various manners of arrangement.

It is believed that the features of the present invention will be fully understood from the foregoing detailed description. It is to be noted that the invention provides packing carrying units to be replaceably mounted on the core of a piston that are extremely simple and inexpensive of construction. It will be further noted that the invention provides a simple and effective means for securing the units on the core. The nut 23 acting through the end plate 24 operates to clamp the units A on the core to be in operative positions, and also acts to secure the core 18 on the piston rod 16. The flexible means 21, 21ᵃ or 21ᵇ for mounting or securing the packing to the bodies of the units, are particularly effective in bonding the packing to the bodies and are inexpensive of manufacture.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. A piston including, a core, a unit detachably mounted on the core including, a substantially rigid body, resilient packing on the body, and a flexible member embedded in the packing and attached to the body.

2. A piston including, a core, and a unit detachably mounted on the core including, a body, a bonding member spaced from the body and attached to the body at spaced points, and resilient packing molded on the body encasing the bonding member.

3. A piston including, a core, and a unit detachably mounted on the core including, a body, a flexible bonding member spaced from the body and attached to body at spaced points, and resilient packing molded on the body encasing the bonding member.

4. A piston including, a core, and a unit detachably mounted on the core including, a body having a radial flange, a bonding member spaced from the body and attached to the body at spaced points, and resilient packing molded on the body and flange and encasing the bonding member.

5. A piston including, a core, a replaceable unit detachably mounted on the core including a substantially rigid body, lugs projecting from the body at spaced points, a flexible metallic bonding member spaced from the body and attached to the lugs, a resilient packing molded on the body and encasing the lugs and the bonding member.

6. A piston including, a core, a replaceable unit detachably mounted on the core including a substantially rigid body having a tubular portion surrounding the core and radial flange at one end of the tubular portion, spaced lugs projecting from the tubular portion, a bonding member spaced from the tubular portion and attached to the lugs, and resilient packing molded on the tubular portion and the inner side of the flange and encasing the lugs and bonding member.

7. A piston adapted to be mounted on a piston rod which includes, a core to be mounted on the piston rod, and two like oppositely disposed units detachably mounted on the core, each unit including a body having a tubular portion surrounding the core and a radial flange at an end of the tubular portion, a bonding member around the tubular portion spaced from the tubular portion and attached to the tubular portion at spaced points, a body of packing molded on the tubular portion and the outer side of the flange and encasing the bonding member, the flanges of the two units being in abutment.

In witness that I claim the foregoing I have hereunto subscribed my name this 14th day of February, 1930.

MARCUS ARMENTROUT.